Jan. 26, 1965   A. G. BODINE, JR   3,167,669
ELECTROMAGNETIC ROTARY FIELD APPARATUS FOR GENERATING
AND APPLYING GYRATORY SONIC VIBRATIONS
Original Filed Nov. 6, 1958

*INVENTOR.*
ALBERT G. BODINE JR.

BY

ATTORNEYS

United States Patent Office 3,167,669
Patented Jan. 26, 1965

3,167,669
ELECTROMAGNETIC ROTARY FIELD APPARATUS FOR GENERATING AND APPLYING GYRATORY SONIC VIBRATIONS
Albert G. Bodine, Jr., Sherman Oaks, Calif.
(7877 Woodley Ave., Van Nuys, Calif.)
Application Sept. 12, 1960, Ser. No. 55,537, which is a division of application Ser. No. 825,117, July 6, 1959, which in turn is a division of application Ser. No. 772,210, Nov. 6, 1958, now Patent No. 2,960,317. Divided and this application Oct. 10, 1961, Ser. No. 144,218
3 Claims. (Cl. 310—10)

This invention relates generally to apparatus for generation and application of relatively high sonic power.

This application is a division of my co-pending application Serial No. 55,537, filed September 12, 1960, entitled Method and Apparatus for Generating and Transmitting Sonic Vibrations, which was in turn a division of my earlier application of the same title, Serial No. 825,117, filed July 6, 1959. Said application Serial No. 825,117 (now abandoned), was also, insofar as the subject matter of the present case is concerned, a division of my earlier application, Serial No. 772,210, filed November 6, 1958, also of the same title, now Patent No. 2,960,317.

A large number of useful industrial applications, too well known to require description herein, have been found for application of high sonic power.

An object of the invention is the provision of a simple but unique generator of high sonic power, readily adaptable to many industrial applications, and particularly, though without limitation, to certain situations calling for sonic vibration or agitation of fluids or liquids.

In accordance with one illustrative practice of the invention a longitudinally extended elastic member, of magnetic material, such as a steel pipe, or wire, is clamped adjacent its ends, and is subjected at its mid-section to a rotating magnetic field force vector. The mid-section of the pipe is thereby magnetically acted upon to gyrate in a circular path. The pipe being clamped at its two ends, is thus placed in tension, and elastically deflected in a transverse plane, so as to move in a circle, the diameter of which increases from substantially zero at the two clamped ends to a maximum at the mid-point of the pipe. The motion can be described as two half wavelength modes, in quadrature, this means two sonic wave patterns at 90° in time and in plane of vibration. The resulting gyratory action of the pipe acts upon a liquid in contact with the pipe, either inside or outside the pipe, or may be transmitted to a body to be vibrated.

The invention will be best understood from the following detailed description of certain present illustrative embodiments thereof, reference for this purpose being had to the accompanying drawings, in which.

Figure 1:
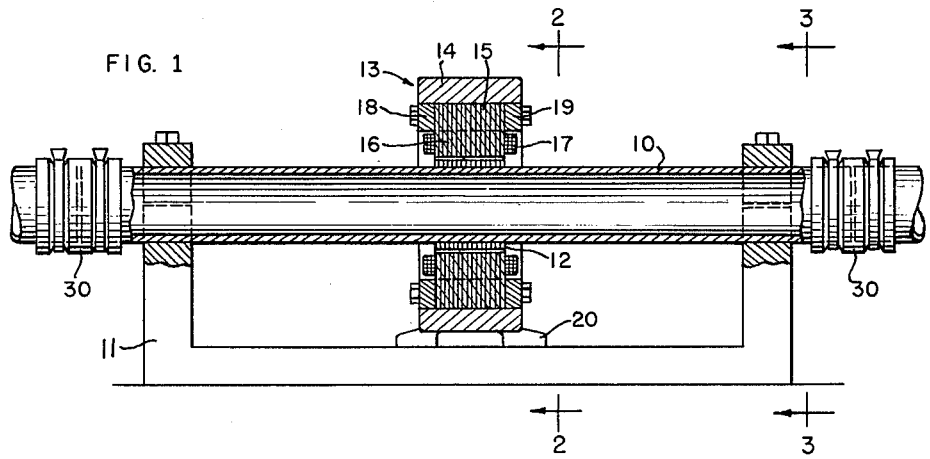
FIG. 1 is a view, partly in side elevation and partly in medial longitudinal section, showing one illustrative embodiment of the invention.
Figure 2:
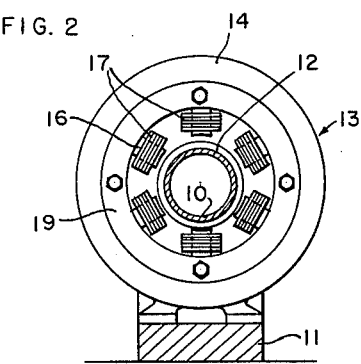
FIG. 2 is a section taken on line 2—2 of FIG. 1.
Figure 3:
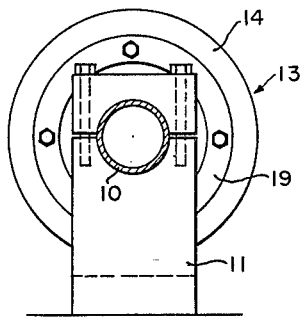
FIG. 3 is a section taken on line 3—3 of FIG. 1.

FIGS. 1 to 4 show a form of apparatus in accordance with the invention, useful for various purposes, including the treatment of liquids passing either through or around the pipe in which the gyratory vibrations are generated. Numeral 10 designates generally a pipe, rigidly clamped near its ends, as in a clamping frame 11. The pipe 10 is preferably of a magnetic material, such as steel, but may be of a nonferrous, electrically conductive, metal, such as brass. In the present instance, the pipe has mounted on its central portion a laminated iron magnetic armature 12.

A stator 13, adapted to create a rotating magnetic field, surrounds the mid-portion of tube 10. This stator is similar to the stator of a salient pole type induction motor. It is composed of a frame 14 in which is mounted an iron core 15 composed of laminated iron rings providing, in this instance, six pole pieces 16 for pole windings 17. The laminated core is secured in assembly by end rings 18 and 19 suitably mounted in side frame 14. Frame 14 is provided with mounting feet 20. The tips of the pole pieces have a small radial clearance with the armature 12, adequate to accommodate the gyratory motion of the latter.

Figure 4:
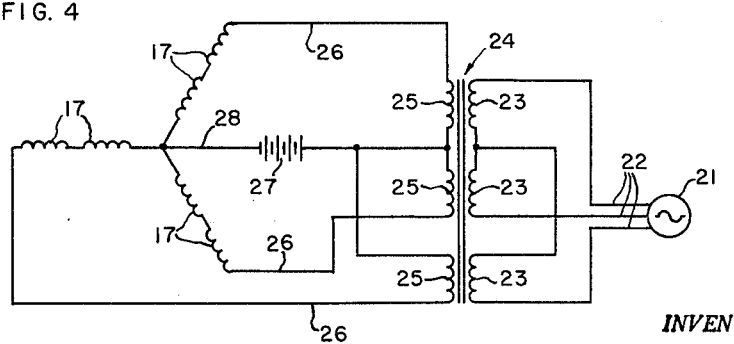
FIG. 4 is an illustrative wiring circuit for the apparatus of FIGS. 1–3.

FIG. 4 shows one illustrative system for energizing the pole piece windings so as to establish the desired rotating magnetic force vector acting on the armature 12. The numeral 21 indicates a variable frequency source of high frequency polyphase electric current. An alternator designed to generate the necessary high frequency current and capable of being driven through an appropriate speed range, a variable frequency electronic oscillator, or any other source of variable high frequency alternating current may be used. If the internal impedance of this source does not sufficiently match the impedance of the stator coils, an impedance matching transformer may be employed. Thus, as here shown, the current from a suitable three phase source 21 is supplied by leads 22 to the Y-connected primary windings 23 of impedance matching transformer 24. Current is delivered from the secondary windings 25 of the transformer by leads 26 going to the Y connected windings 17 of stator 13. In the present illustrative case, two series connected windings 17 make up each phase, and these are placed on adjacent pole pieces of the stator, with the windings arranged to give adjacent pole pieces unlike polarities. In the illustrative embodiment, there are six pole pieces, and it will be understood that the two windings 17 of one phase of the Y are placed on two adjacent pole pieces, the two windings 17 of a second phase are placed on the next two adjacent pole pieces, and the two windings 17 of the third phase are placed on the remaining two adjacent pole pieces, the directions of the windings being always such as to give alternately north and south polarities to successive pole pieces.

In addition, it is found preferable to polarize the windings with a direct current, and for this purpose, a battery 27 is shown as connected into the neutral lead 28 of the Y-connected stator coils. Battery 27 supplies the stator coils 17 with a constant direct current which exceeds, or at least equals, the maximum effective value of the current supplied by the alternator, thus producing a net effective current in each pair of adjacent stator coils 17 which is constant in direction of flow but undulating in amplitude. The two series connected windings 17 of the two members of each pair of pole pieces being in opposite directions, so as to give unlike polarities, the magnetic field circuit extends between the pole faces, and the field strength in this region is undulatory in correspondence with the alternating energizing current of the corresponding phase of the system. It will be clear that the field strengths of the three pairs of pole pieces will vary or undulate with 120° phase difference. In consequence, the pipe-mounted armature 12 is successively pulled by magnetic attraction toward successive pairs of pole pieces as the field strengths therebetween pass through their maximum values. The pipe 10 goes into tension, and deflects elastically in a transverse plane to accommodate the magnetic forces. The armature and pipe are thus first moved toward one pair of the pole pieces, then toward the second, and then toward the third, and thus are caused to spin or gyrate in response to a rotating magnetic force vector.

The pipe 10, clamped rigidly at its ends, may be subject to vibration according to the principles governing vibrating strings clamped at both ends, including manifestations of standing wave behavior when the pipe behaves as an elastic member and the exciting frequency (in this case, the frequency of rotation of the magnetic field, or magnetic force vector) approximates a resonant frequency of the clamped member for transverse vibration. The gyratory motion of the pipe may be analyzed as a resultant of two transverse harmonic vibrations of 90° phase difference.

Maximum elastic deflection of the pipe at its central region, i.e., a gyrational path of maximum diameter, is achieved by having the pipe length between supports equal to that for resonant gyration at the exciting frequency. Several standing wave modes of vibration are of course possible, such as half wave, full wave, etc.

It will be seen that the apparatus described is suitable for sonic vibratory treatment of a fluid flowing through the pipe 10, and flexible couplings 30 are shown as coupling the pipe 10 to fragmentarily illustrated fluid supply and discharge pipes. The pipe 10 can also be sonically coupled to a body of liquid contacting its outer surface.

I have further discovered that a pipe or other longitudinally extended member of electrically conductive material, such as brass, vibrates in similar mode, apparently because of eddy currents. When a nonferrous metal is used for the vibrating tube the direct current bias is unnecessary. The circuit shown in FIG. 4 may be used with battery 27 and lead 28 omitted. In operation, the rotating field of the stator generates eddy currents in the conductive pipe, and the fields accompanying these eddy currents react with the rotating field of the stator to develop a rotating force component on the pipe which sets the pipe into the desired gyrating mode of vibration.

Another form of the invention is presented by assuming the embodiment of FIGS. 1–4 to be modified to the extent that the gyratory member 10 is made very slender in relation to its length, and is arranged so it becomes, in effect, a slack wire, clamped at its ends. It may carry a magnetic armature at its midpoint, or may itself be composed of magnetic material. Under this condition, the modified, wire-like gyratory member whirls under influence of the rotating magnetic field, somewhat after the fashion of a rope tied at each end to a stake and moved at its center through a substantial circle. There is no resonant effect in this system, because there is no appreciable elastic stiffness reactance. This system will afford large amplitude of gyration at high frequencies. The outside surface of the whirling wire is capable of being coupled for application of vibratory energy to whatever device or medium is to be vibrated thereby. For example, the wire may be whirled within a body of liquid to be treated. Alternatively, one of the end clamps of the wire may be compliantly mounted, or may be designed for an inherent degree of elastic compliance, and may be coupled to whatever device is to be vibrated.

I claim:

1. In a gyratory sonic vibration generator, the combination of: a gyrationally compliant shaft member, means for clamping said member in such manner as to hold longitudinal tension thereof between two points spaced longitudinally thereof, at least a portion of said member between its clamped points being composed of a material capable of receiving a lateral thrust in response to a magnetic field in a plane transverse to said member, and means for subjecting said portion of said member to a rotating electromagnetic field force transversely intersecting and turning about an axis parallel to said member.

2. In a gyratory sonic vibration generator, the combination of: a gyrationally compliant elastic pipe having at least an intermediate portion thereof of magnetic material, a pair of fixed clamping means rigidly clamping said pipe at two points on opposite sides of said intermediate portion, and a field generator for subjecting said intermediate portion of said pipe to a rotating electromagnetic field force transversely intersecting the pipe and turning about an axis parallel to the pipe.

3. The subject matter of claim 2, including means operating said field generator to produce a field which rotates at a frequency approximating a resonant vibration frequency for a transverse mode of vibration of the portion of said pipe between its two clamp points.

References Cited in the file of this patent

UNITED STATES PATENTS

| | | |
|---|---|---|
| 975,571 | Potter | Nov. 10, 1910 |
| 1,975,517 | Nicolson | Oct. 2, 1934 |
| 2,198,304 | Cornelius | Apr. 23, 1940 |
| 2,199,351 | Taylor | Apr. 30, 1940 |
| 2,320,843 | Baudry | June 1, 1943 |
| 2,439,499 | Williams et al. | Apr. 13, 1948 |
| 2,512,406 | Winer | June 20, 1950 |
| 2,702,691 | Virmani | Feb. 22, 1955 |
| 2,834,158 | Peterman | May 13, 1958 |